W. H. ROBINSON.
MACHINE FOR PACKING CAPS IN CANS.
APPLICATION FILED JAN. 20, 1910.
982,092.
Patented Jan. 17, 1911.
2 SHEETS—SHEET 1.
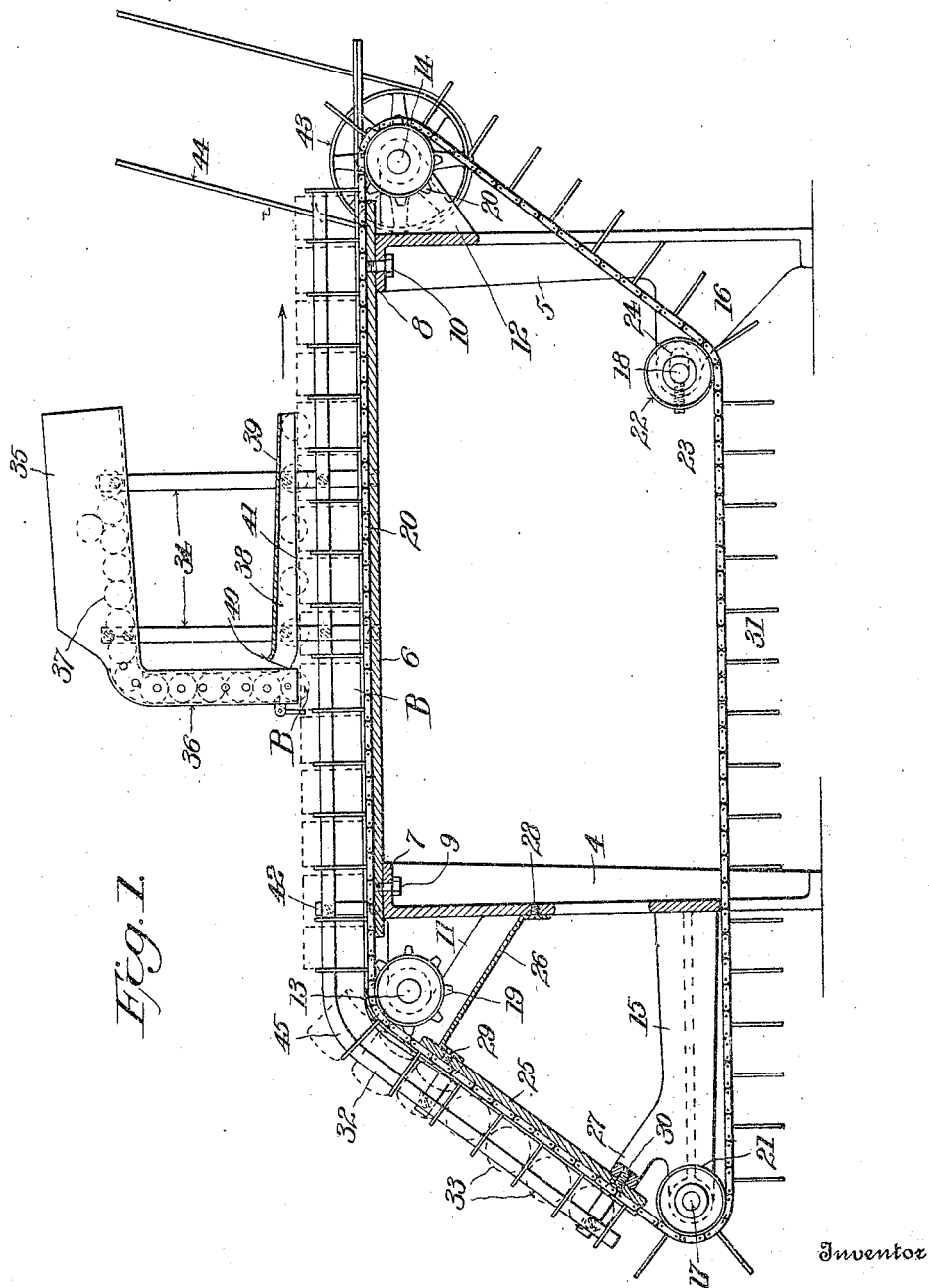
Witnesses
C. L. Walker.
E. Walton Brevington.
Inventor
Walter H. Robinson,
By Henry S. Brevington,
Attorney

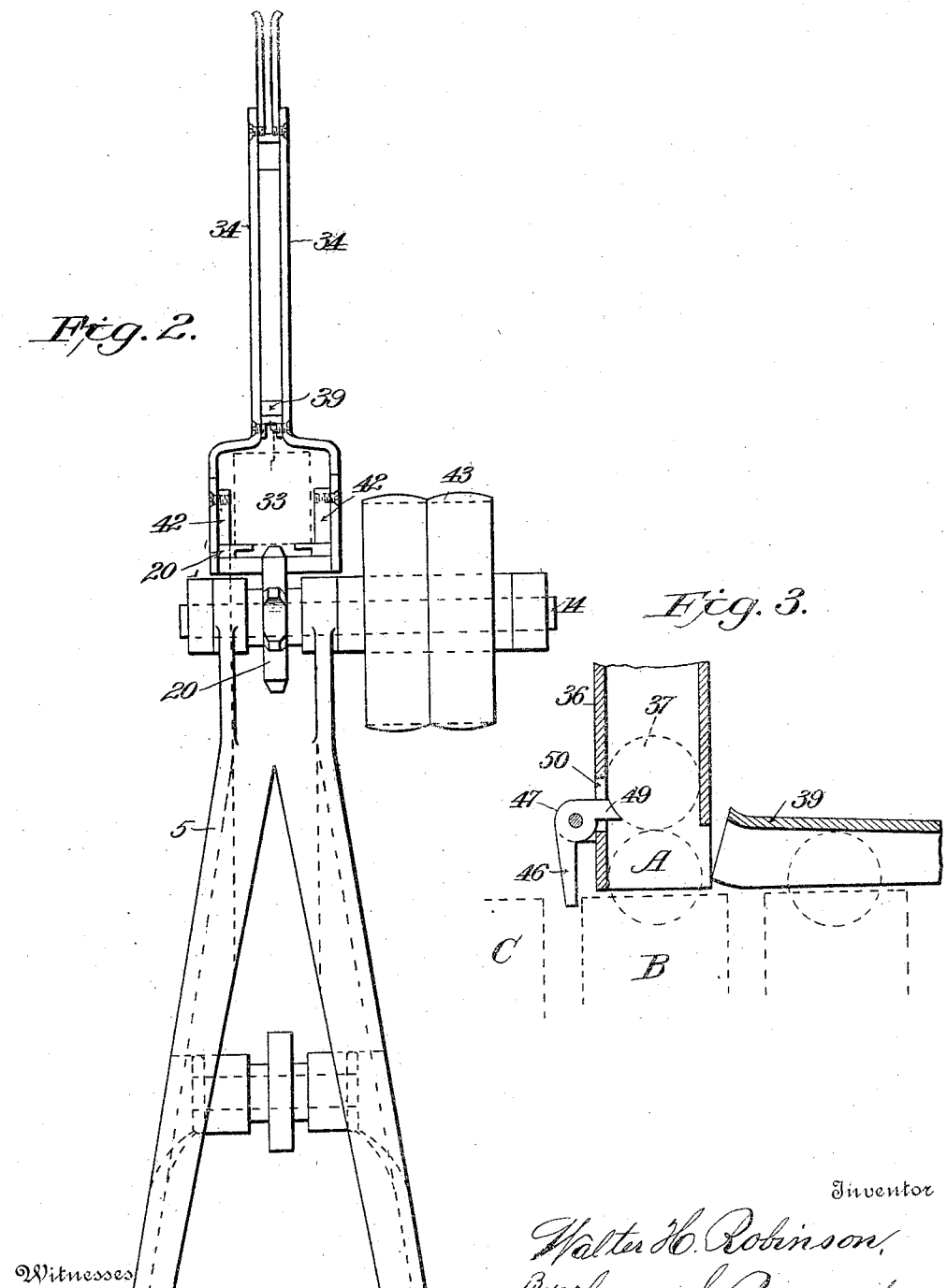

UNITED STATES PATENT OFFICE.

WALTER H. ROBINSON, OF BALTIMORE, MARYLAND.

MACHINE FOR PACKING CAPS IN CANS.

982,092.   Specification of Letters Patent.   Patented Jan. 17, 1911.

Application filed January 20, 1910. Serial No. 539,069.

*To all whom it may concern:*

Be it known that I, WALTER H. ROBINSON, a citizen of the United States, residing at Baltimore city, State of Maryland, have invented certain new and useful Improvements in Machines for Packing Caps in Cans, of which the following is a specification.

This invention relates to machines for storing the caps of cans within the empty can itself for purposes of shipping, storage, etc., to prevent the misplacement and consequent loss of the caps.

The object of the invention is to provide a simple, economically constructed and rapidly working machine for the accomplishment of the purpose specified and with this object in view the invention consists in the improved construction, arrangement and combination of parts all as hereinafter fully described and afterward specifically claimed.

I have illustrated an embodiment of my invention in the accompanying drawings, in which, Figure 1 is a longitudinal vertical sectional view of an apparatus constructed in accordance with my invention. Fig. 2 is an end elevation thereof and Fig. 3 is a partial sectional view on the same plane as Fig. 1 showing in detail the cap feeding trip.

Like reference characters mark the same parts in all of the figures.

Referring specifically to the drawings, 4 and 5 indicate the legs or supports of a table 6, these three parts forming substantially the framework of the machine, the legs 4 and 5 being provided with top flanges 7 and 8 upon which the table 6 rests and to which said table is secured by any suitable means, as for instance, bolts 9 and 10.

Projecting from the legs 4 and 5, near the top thereof, are brackets 11 and 12 in which are formed bearings for shafts 13 and 14 and near the bottom of said legs are brackets 15 and 16 in which are formed bearings for shafts 17 and 18. On the shafts 13 and 14 are mounted sprocket wheels 19 and 20 which serve to drive an endless belt or chain 20 which rests upon the table 6 for its full length, and passing over a sprocket wheel at each end is carried downward around idler wheels 21 and 22 mounted on the shafts 17 and 18. The shaft 18, and any of the other shafts if desired, may be made adjustable in order to tighten the endless belt or chain 20 by any suitable means, such, for instance, as screws 23 passing through the bracket 16 and bearing upon the side of the shaft 18, the shaft, for purposes of such adjustment, being journaled in a slot as at 24, in the bracket 16, shown in dotted lines.

An inclined table 25 is supported from the leg 4 by means of a bracket 26 and an arm 27 from the bracket 15, the bracket 26 being secured to the leg 4 by a bolt 28 and to the table 25 by a bolt 29 and the arm 27 being secured to the table 25 by a bolt 30.

Projecting from the endless belt or chain 20 and at right angles thereto, are blades 31, which, in the movement of the chain or belt, pass between rails 32, such blades serving as supports for cans 33, as hereinafter explained.

Rising from the sides of the table 6, are uprights 34 between which is supported a box or hopper 35, slightly inclined downward toward one end, from which end a spout or guideway 36 for can tops 37, leads downward to a level with the top of can bodies being carried along by the chain or belt 6.

Leading forward, (to the right as illustrated in Fig. 1) from the delivery spout 36, is a guideway 38, the top of which is inclined downward toward the right while its left hand end, as at 40, is slightly bent upward, said guide way being substantially U-shaped in cross section with its lower edge 41 parallel with and closely adjacent to the tops of the can bodies.

The rail 32, before mentioned, is supported by bars 42 secured to the sides of the table 6.

The endless chain or belt 20 is driven so as to carry its top across the table in the direction of the arrow, by means of a belt pulley 43 and a belt 44 leading from any suitable driven shaft, or said shaft 14 may be driven by any other suitable means. Cans are fed either by hand or from a suitable chute or trough into the spaces between the blades 31 of the belt or chain 20, at its lower left hand corner in Fig. 1, and are carried upward along the inclined table or shelf 25, and onto the table 6 with their heads, which contain the openings to be afterward sealed by a cap, upward. As the cans move along, the can heads drop downward through the spout 36 and engage in the opening in the top of the can body. When the lower can cap A is in this position in can body B, as shown in Figs. 1 and 3, the forward motion of the chain or belt 20 will carry this can cap A under the inclined top of the guide 39 until the can cap A is forced through the opening in the head of the can body, said can cap dropping into the interior of the can body as soon as it has been forced slightly over one-half of this diameter into the opening. As the can body C, best shown in Fig. 3, passes along with the chain or belt 20, behind the can body B, the upper part of said can body C strikes one arm 46 of a gravity operated elbow lever 47 pivoted on a shaft 48 mounted in bearings projecting from the spout 36, the other arm 49 of said elbow lever 47 projecting through an opening 50 in said spout 36 in the path of travel of the can caps 37 passing down through the spout in position to prevent the can caps following the can cap A from dropping downward until the can body C is in position to receive it. The can body C pressing against the arm 36 turns the elbow lever 47 on its pivotal shaft 48 and withdraws the arm 49 from the path of the next succeeding can cap 37 and thus permits the said can cap to drop down into the position of the can cap A as the latter is pressed along under the inclined guide 39, as before explained. The edges of the opening in the heads of the cans, and of the can caps being bent over, are to a certain extent elastic, sufficiently so to permit of the can cap being forced through the opening into the interior of the can body without disfiguring either the cap or the edge of the opening. With the can caps inside of the can bodies, the latter may be stored or shipped at pleasure without any possibility of the can cap being discharged accidentally from the can and lost or mislaid as very often happens when the caps are shipped separate from the bodies. The force necessary to remove the caps from the bodies when it is desired to use the can is very slight, the caps being removable by pulling them out with the fingers, or with a suitable tool provided for the purpose.

While I have specifically described the construction of the apparatus illustrated as embodying my invention, it will be obvious that many of the details thereof may be varied in form and location without departing from the spirit of the invention.

Having described my invention, what I claim and desire to secure by Letters Patent, is—

1. In a machine of the character described, the combination with a conveyer for the cans, of a chute for conducting the can caps edgewise into the openings of the can heads, and a rigid means having an inclined top for forcing the can caps through said openings into the interior of the can bodies.

2. In a machine of the character described, the combination with a conveyer for the cans, of a chute for conducting the can caps edgewise into the openings of the can heads, and a rigid means having an inclined top for forcing the can caps through said openings into the interior of the can bodies, comprising a guide with open bottoms and inclined top under which the can tops pass.

3. In a machine of the character described, the combination with a conveyer for the cans, of a chute for conducting the can caps into the openings of the can heads, and means for forcing the can caps through said openings into the interior of the can bodies, comprising an inverted guide, U-shaped in cross section, diminishing in height in the direction the cans are conveyed.

4. In a machine of the character described, the combination with a conveyer for the cans, of a chute for conducting the can caps edgewise into the openings of the can heads, means operated by the next successive can for permitting the discharge of one cap at a time from the chute, and a rigid means having an inclined top for forcing the can caps through said openings into the interior of the can bodies.

5. In a machine of the character described, the combination with a conveyer for the cans, of a chute for conducting the can caps edgewise into the openings of the can heads, means operated by the next successive can for permitting the discharge of one cap at a time from the chute operated by a can in the conveyer, and a rigid means having an inclined top for forcing the can caps through said openings into the interior of the can bodies.

6. In a machine of the character described, the combination with a conveyer for the cans, of a chute for conducting the can caps edgewise into the openings of the can heads, means for permitting the discharge of one cap at a time from the chute operated by a can in the conveyer other than the can being provided with a head, and a rigid means having an inclined top for forcing the can caps through said openings into the interior of the can bodies comprising a guide with open bottom and inclined top under which the can tops pass.

7. In a machine of the character described, the combination with a conveyer for the cans, of a chute for conducting the can caps into the openings of the can heads, means for permitting the discharge of one cap at a time from the chute operated by a can in the conveyer, and means for forcing the can caps through the interior of the can bodies comprising an inverted guide, U-shaped in cross section, diminishing in height in the direction the cans are conveyed.

8. In a machine of the character described, the combination with a conveyer for the cans, of a chute for conducting the can caps edgewise into the openings of the can heads, means for permitting the discharge of one cap at a time from the chute, comprising a gravity operated elbow lever pivoted in an opening in one side of the chute having one arm projecting into the chute in the path traveled by the caps therein, and means having an inclined top for forcing the can caps through said openings into the interior of the can bodies.

9. In a machine of the character described, the combination with a conveyer for the cans, of a chute for conducting the can caps into the openings of the can heads, means for permitting the discharge of one cap at a time from the chute, comprising an elbow lever pivoted in an opening in one side of the chute having one arm projecting into the chute in the path traveled by the caps therein and the other arm outside the chute in the path of a can carried by the conveyer, and means for forcing the can caps through said opening into the interior of the can bodies.

In testimony whereof I affix my signature in presence of two witnesses.

WALTER H. ROBINSON.

Witnesses:
    E. WALTON BREWINGTON,
    BROWN M. ALLEN.